May 26, 1964      P. MODIGLIANI      3,134,704
METHOD OF AND APPARATUS FOR MULTIPLE FORMING AND WINDING
OF GLASS AND RESIN FILAMENTS

Filed May 13, 1960      3 Sheets-Sheet 1

INVENTOR
PIERO MODIGLIANI
BY
ATTORNEY

INVENTOR
PIERO MODIGLIANI

ATTORNEY

May 26, 1964 P. MODIGLIANI 3,134,704
METHOD OF AND APPARATUS FOR MULTIPLE FORMING AND WINDING
OF GLASS AND RESIN FILAMENTS
Filed May 13, 1960 3 Sheets-Sheet 3
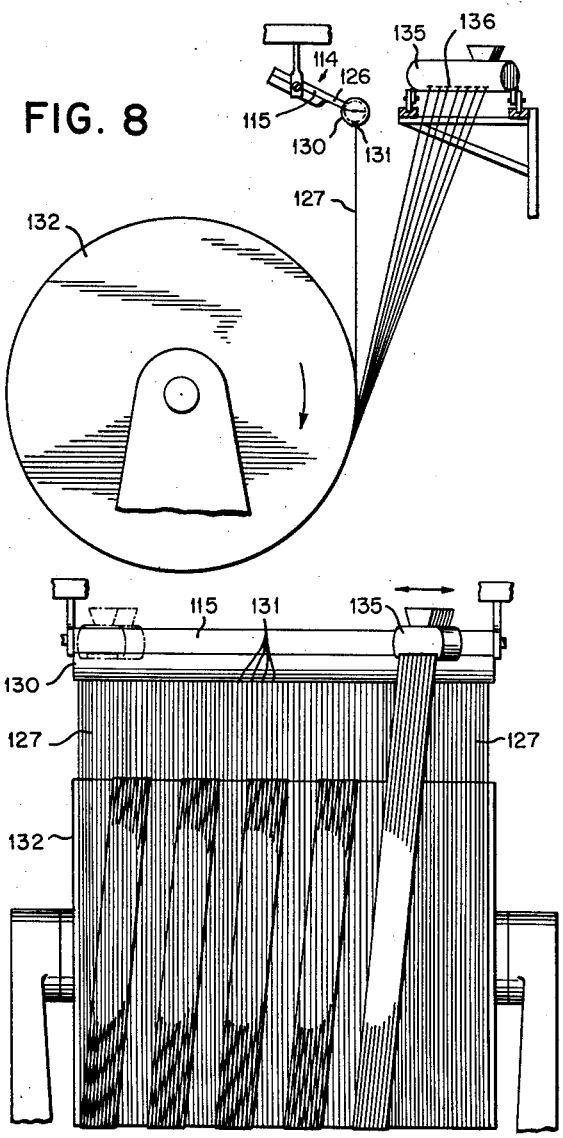
FIG. 8
FIG. 9
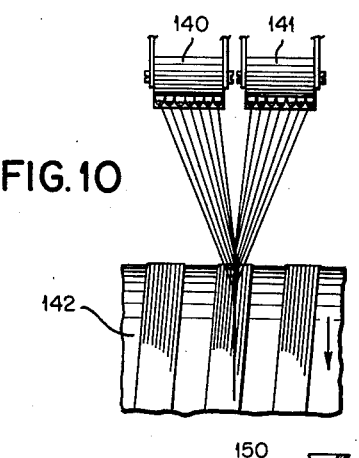
FIG. 10
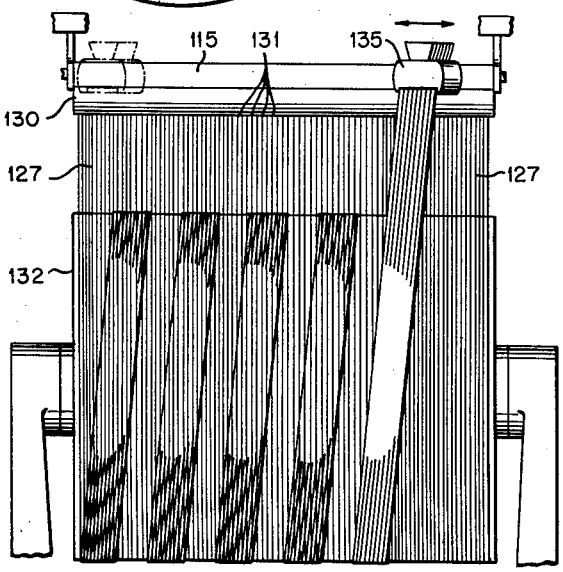
FIG. 13
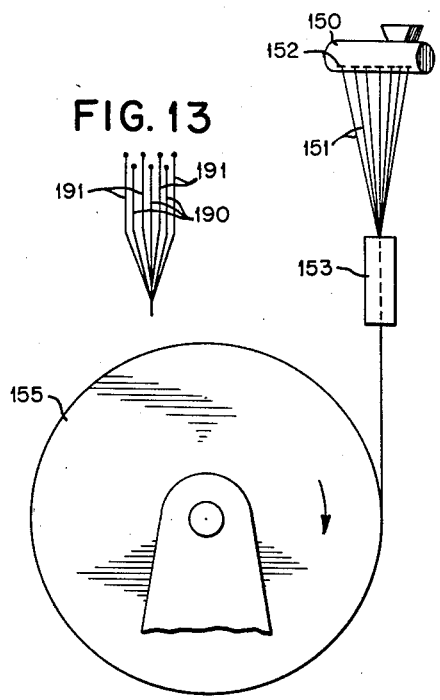
FIG. 11
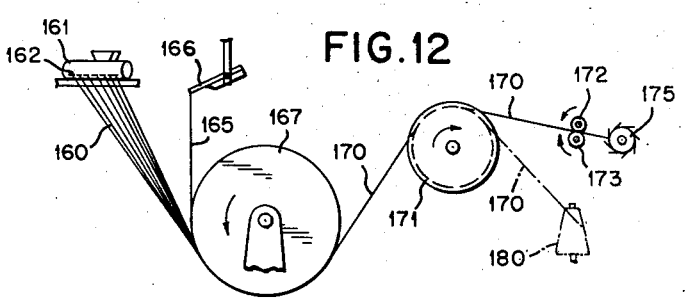
FIG. 12
INVENTOR
PIERO MODIGLIANI
BY
ATTORNEY

United States Patent Office 3,134,704
Patented May 26, 1964

3,134,704
METHOD OF AND APPARATUS FOR MULTIPLE FORMING AND WINDING OF GLASS AND RESIN FILAMENTS
Piero Modigliani, Morristown, N.J., assignor, by mesne assignments, to Reichhold Chemicals, Inc., White Plains, N.Y., a corporation of Delaware
Filed May 13, 1960, Ser. No. 28,987
30 Claims. (Cl. 156—167)

My present invention relates to method of and apparatus for forming and winding a filamentary product comprised of glass filaments and resin filaments.

Glass filaments are formed in various ways, including the method disclosed in my Modigliani Patent No. 2,081,060.

My present invention will be described for convenience with reference to forming the glass filaments in the manner and method disclosed generally in my aforesaid patent, wherein glass fibers are drawn directly from the orifice plate of a melting furnace, or furnaces, and accumulated on a rotating drum. The furnace and drum are reciprocated relatively, so that the filaments of each of the layers of filaments accumulated on the drum are crossed with respect to the filaments of adjacent layers. The angle of crossing depends upon the relative speeds of rotation of the drum and reciprocation of the melting furnace. As disclosed in my recent Patent No. 2,913,037, where the mat formed on the drum is composed of layers of tapes or strands, the tapes or strands may be "peeled" from the drum and rewound on spools.

The relatively loose, weak, fibrous product thus formed, for a number of uses, is impregnated with a suitable resin binder to strengthen it and give it sheet-like characteristics. The binder employed preferably may be either a thermosetting or a thermoplastic binder. Although the resins most used with glass filaments are the polyesters, epoxy and phenolic resins; acrylate resins, vinyls, silicones, etc. are also used, as is well known in the art.

As disclosed in my Modigliani Patent Nos. 2,609,320; 2,729,582; and 2,913,037, the binder is sprayed in an emulsion or solution on the glass filaments at the drum periodically during the formation of the condensed mat, if it were desired to rewind the strands of glass filaments being formed for sale in that form. In such case, it is preferable to select a binder which would be at least partially cured by contact with the air during the movement of the drum. If an expanded product of the type disclosed in my Patent No. 2,609,320 were desired, the binder could be sprayed at the drum or applied to the mat by drawing the mat through an emulsion or solution of binder in the tank.

In my present invention, I have discovered a method by which filaments of resin may be drawn from molten chunks of unsaturated resin (polyesters, epoxy, phenolic, etc.), or from a highly viscous polymer (acrylics, silicones, hydrocarbons, etc.) from a bushing, or a forming unit such as disclosed herein, over a drum or spool in much the same way as glass filaments are drawn as disclosed in my above mentioned patents. A catalyst and a monomer or hardener are applied to the filaments before or when they reach the drum or spool when the thermoplastic resin has had a chance to cool rapidly because of the large surface area exposed by such small diameter filaments. The resin filaments remain as filaments only for a short time while they cool rapidly and are wound side by side with the glass filaments, and the resin filaments are diffused at the drum by the catalysts and monomers, or with heat.

It is to be noted that by drawing the mass of viscous resin in fine filaments having a large exposed surface area in comparison with a small diameter which results in a very rapid cooling of the filaments, my improved method does not require the use of additional coolant means for the resins, such as is necessitated in the use of previously known methods.

One object of my present invention is to precisely and uniformly distribute predetermined amounts of a resin binder with glass filaments.

Another object of my invention is to eliminate the loss of resin material, and the somewhat uncontrolled distribution thereof as now exists under present known methods, wherein the resin is applied to glass filaments by spraying at the drum or by dipping in a tank.

Another feature of my invention is that by my improved method premix compounds and preimpregnating material are formed during the glass spinning operation, which premix compounds and preimpregnating material may be converted into final laminations only by the application of heat and pressure.

Another feature of my invention is that no lubricant is necessary when making strands and rovings of glass filaments, as the resin filaments combined with the glass filaments protect the glass filaments from abrasion.

My invention may be more fully understood and further objects and advantages will become apparent when reference is made to the more detailed description of the invention with respect to the accompanying drawings, in which:

FIG. 8 is a front elevation of a modified form of resin filament forming unit.

FIG. 9 is an end view of the apparatus shown in FIG. 8.

FIG. 10 is still another modified form of apparatus.

FIG. 11 is a modified form of resin filament forming apparatus for forming filaments from two different resins.

FIG. 12 is still another modified form of apparatus.

FIG. 13 is a diagrammatic representation of the alternate positioning of filaments of resin and glass.

Figure 1:
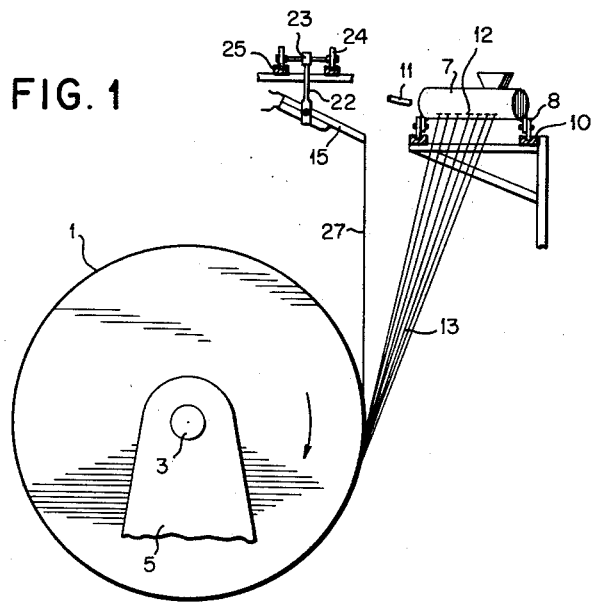
FIG. 1 is an end view of one form of apparatus of the invention.

Referring to FIGS. 1 to 4 inclusive; the drum 1, having a shaft 3, is mounted in supports 5 for rotation by any conventional means in the direction of the arrow in FIG. 1, i.e., in a direction such that the right hand portion of the drum in FIG. 1 moves downwardly. Mounted above the downturning edge of the drum is a glass melting furnace 7 supported on wheels 8 on a trackway 10. The melting furnace 7 is a conventional gas-fired furnace, heat being supplied to the interior of the furnace by a burner 11 positioned to direct a flame through an opening in the end wall of the furnace 7. The furnace is provided with an orifice plate 12 having any desired number of rows of orifices, or openings, therein. In operation of the glass furnace, the usual glass forming components are melted in the melting furnace 7, and when the glass tends to flow from the orifices of the orifice plate 12, the glass filaments 13 are drawn from the orifices manually and are placed on the surface of the drum 1 which is rotated relatively rapidly and continues to draw glass filaments from the orifices. While the drum is drawing glass filaments from the orifices, the furnace 7 is reciprocated back and forth in a direction parallel to the axis of rotation of the drum 1. If desired, two furnaces spaced apart approximately one-half the length of the drum 1 may be connected for reciprocation in unison.

Figure 3:
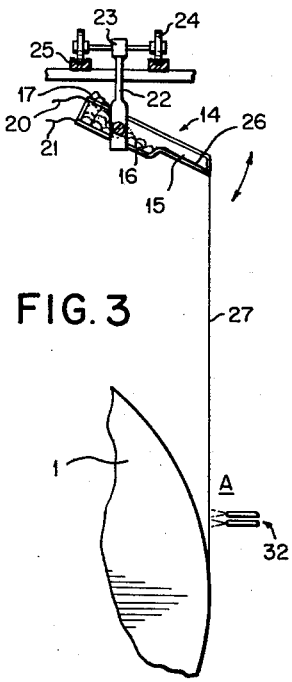
FIG. 3 is an enlarged fragmentary end view of the resin filament forming unit and a portion of the drum.
Figure 2:
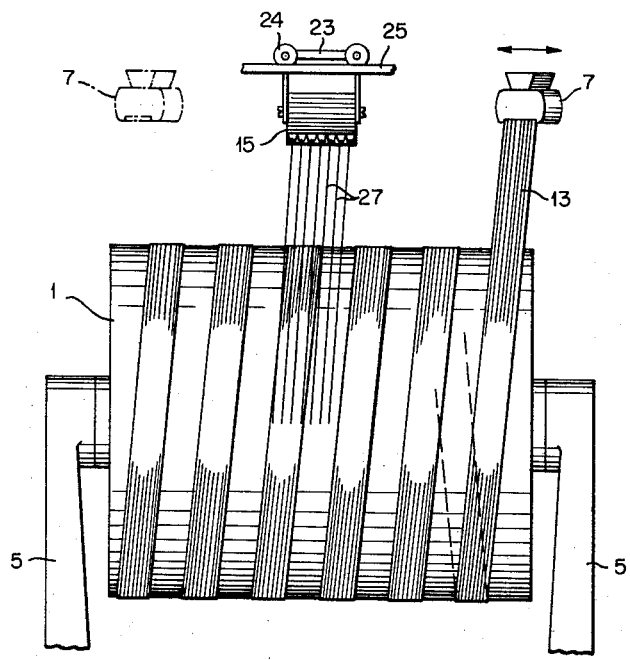
FIG. 2 is a front elevation of the apparatus shown in FIG. 1.
Figure 4:
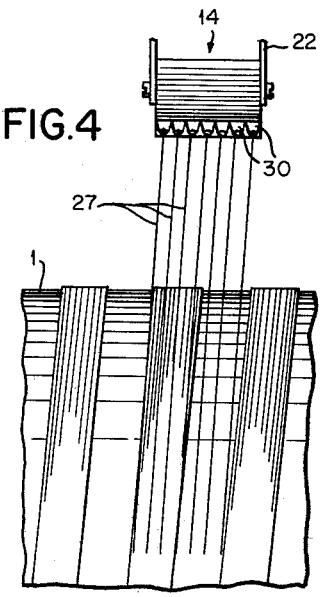
FIG. 4 is an enlarged fragmentary front elevation of the resin filament forming unit.

The resin filament forming unit 14, as shown in FIGS. 3 and 4, includes a housing member 15 provided with a well-like portion 16. As indicated at 17, chunks of resin are introduced into the well 16 and melted to the desired degree of viscosity, or fluidity, conveniently by means of a conventional electrical heating unit connected to an electrical circuit including electrical conduit wires 20 and 21. I find it convenient to pivotally mount the housing member 15 on supporting arms or bracket 22, so that the angularity of the flow portion 26 of the resin filament forming unit may be adjusted selectively for various viscosities of the resins. The member 15 conveniently is supported on carriage means 23 provided with wheels 24 which run on a trackway 25. The carriage 23 is adapted to be reciprocated to and fro in a direction parallel to the axis of rotation of the drum 1 by any conventional means, and such reciprocating movement of the carriage 23 may be at a different rate of travel than that of the glass melting furnace 7.

As indicated in FIG. 4, the forward edge of the housing member 15 is provided with a series of V-shaped or U-shaped openings 30 forming lips over which the melted resin will flow in spaced apart portions. The melted resin being rather viscous, a gob of resin will first collect at the openings, and when the weight thereof becomes sufficient, will drop free by gravity from the bottom of the lip to form a continuous trailing resin filament 27. The gobs of resin with the trailing resin filament 27 pass close enough to the rapidly moving surface of the drum 1 so that the resin filaments will be picked up by the drum by the electrical charge imparted. It is noted that if a break in a resin filament should occur, a new gob will form at the lip and, correspondingly, fall by gravity carrying a new resin filament 27 which will be picked up by the electrostatic charge. The drum 1 is covered at the beginning of a forming operation with a layer of paper, or with a layer of glass filaments.

It is to be understood that my invention is not limited to a resin filament forming unit which includes a housing member with V-shaped or U-shaped openings as disclosed above, as it is obvious that various other constructions may be used. For example, in lieu of V-shaped or U-shaped openings, the viscous resin may flow into a pipe closed at both ends, with the pipe provided with a multiplicity of openings through which the resin will flow and form a multiplicity of resin filaments.

Before or when the resin filaments 27 come into contact with the drum surface, as at A in FIG. 3, the resin filaments 27 are sprayed by any convenient means 32 with a catalyst and a monomer or hardener. It is noted that when resin filaments are spun in combination with glass filaments to make combination products in a mat or strand formation, the glass filaments function as a drawing medium for the resin filaments.

Referring to the form of apparatus shown in FIG. 5; a continuous strand of glass filaments 40, which has been formed previously, is wound upon a spool or spindle 41, rotatably mounted in any convenient manner, as the supply source of glass filaments in lieu of drawing such glass filaments from the melting furnace as heretofore described with reference to the form of apparatus shown in FIGS. 1 to 4 inclusive. A resin filament forming unit 43, similar to the resin filament forming unit 14, is pivotly mounted on the member 45 which is conveniently supported on carriage means 46 provided with wheels which run on a trackway 48 in the same manner as heretofore described with reference to FIGS. 1 to 4 inclusive. The carriage 46 is adapted to be reciprocated to and fro in a direction parallel to the axis of rotation of the drum 50 by any conventional means. The resin filaments 54, formed in the same manner as heretofore described, fall by gravity perpendicular to the drum 50, which is rotating rapidly in the direction of the arrow shown on the drum.

The glass filament strand 40 is withdrawn from the spool 41 and passes with freedom of motion through a guide member 52 carried by, and movable with, the carriage 46 of the resin filament forming unit 43. The glass filament strand 40 passes downwardly from the guide member 52 through another guide member 56 and the glass filament strand 40 is collected with the resin filament strand 54 at a point in advance of which such combined strand comes in contact with the surface of the drum 50, which is initially covered on its surface with paper or other suitable material.

Figure 5:
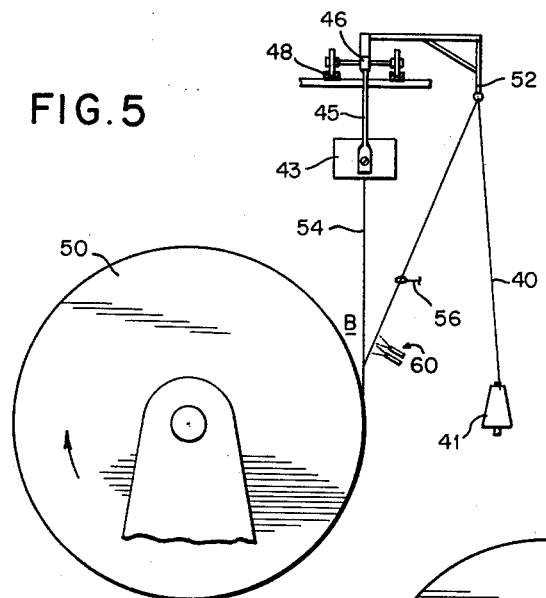
FIG. 5 is an end elevation of a modified form of apparatus wherein the strand or roving of glass filaments has been preformed and wound upon a spool.

Before or after the contacting of the combined strands with the drum surface, as at B in FIG. 5, the resin filaments 54 and glass filaments 40 are sprayed by any convenient means 60 with a catalyst and monomer or hardener. As heretofore stated, the glass filament strand 40 functions as a drawing medium for the resin filaments 54.

Figure 6:
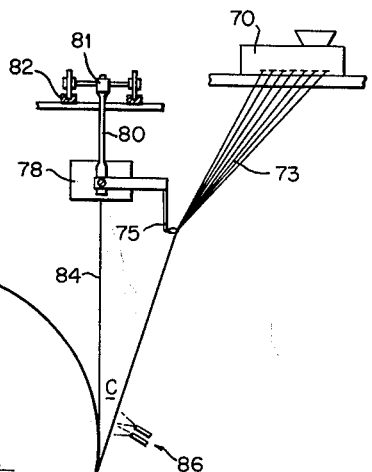
FIG. 6 is still another modified form of apparatus.

Referring to the form of apparatus shown in FIG. 6; a glass melting furnace 70, similar to the glass melting furnace 7 heretofore described, is fixedly mounted in any convenient manner above the drum 72. The glass filaments 73 drawn from the bushing of the melting furnace 70 are collected and drawn through a guide member 75 which is rigidly fixed to and carried by a resin filament forming unit 78 similar to the resin filament forming unit 14 heretofore described. The resin filament forming unit 78 is pivotly mounted on the member 80, which is conveniently supported by carriage means 81 provided with wheels which run on the trackway 82, as heretofore described with reference to FIGS. 1 to 4, inclusive. The carriage 81 is adapted to be reciprocated to and fro in a direction parallel to the axis of rotation of the drum 72 by any conventional means.

The glass filaments 73 collected through the guide member 75 are guided substantially perspendicularly to the surface of the drum 72. The resin filaments 84 are drawn from the resin filament forming unit 78 in the same manner as heretofore described and are combined with the glass filaments 73.

Before or after the contacting of the strands with the drum surface, as at C in FIG. 6, the resin filaments 84 and the glass filaments 73 are sprayed by any convenient means 86 with a catalyst and monomer or hardener. As heretofore stated, the glass filament strand 73 functions as a drawing medium for the resin filament 84.

The combined glass filaments 73 and resin filaments 84 may be withdrawn from the drum 72 and rewound on suitable spools, or spindles, after a desirable amount of such combined filamentary product has been built up on the drum. If desired, the combined filaments instead of being wound on the drum 72 may pass from beneath the bottom of the drum 72, and be rewound directly on suitable spools, or spindles, by means of any well known arrangement of rolls or V-pulleys.

Figure 7:
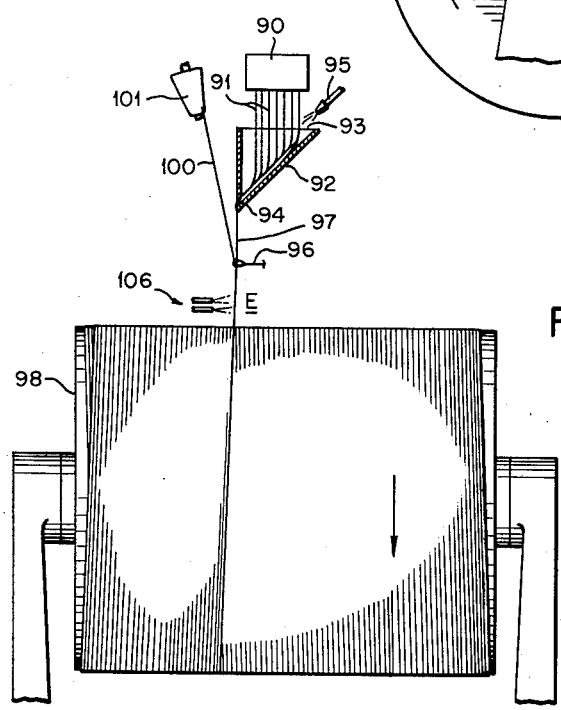
FIG. 7 is still another modified form of apparatus.

Referring to the form of apparatus in FIG. 7; a resin filament forming unit 90, similar to the resin filament forming unit 14, is pivotly mounted on a fixed member, not shown, by any convenient conventional means. The resin filaments 91, drawn from the forming unit 90 in the manner heretofore described, are collected in a funnel-like shaped collector 92 having a wide opening end 93 and a restricted outlet end 94. The resin filaments 91 are propelled in the direction of the arrow in FIG. 7 to and through the outlet end 94 by air under pressure from an air outlet means 95. The formed resin filament roving 97 issuing from the outlet end 94 is passed through the collector guide member 96 and thence perpendicularly to the surface of the spool or drum 98 which is rapidly rotated on its horizontal axis, in the direction of the arrow shown on the drum, by any conventional means.

A continuous roving of glass filaments 100, which has been previously formed, is wound upon a spool or spindle 101 fixedly mounted with freedom of axial rotation by any convenient means. The preformed glass filament roving is used as the source of supply of glass filaments in lieu of directly forming such a glass filament roving from glass filaments drawn from a melting furnace, as heretofore described.

The glass filament roving 100 passes through the collector guide member 96 along with the resin filament roving 97 to the surface of the spool or drum 98, which is being rapidly rotated on its horizontal axis, as heretofore described.

Before or after the contacting of the combined rovings with the surface of the drum 98, as at E in FIG. 7, the resin filament roving 97 and the glass filament roving 100 are sprayed by any convenient means 106 with a catalyst and monomer or hardener. As heretofore stated, the glass filament roving 100 functions as a drawing medium for the resin roving 97.

As shown in FIGS. 8 and 9, a resin filament forming unit 114, similar to the resin filament forming unit 14, includes a housing member 115, similar to the housing member 15. The flow portion 126 of the resin filament forming unit 114 is in open communication with the interior of the hollow pipe 130 which is closed at its outer ends. The pipe 130 is provided with a multiplicity of openings 131 from which resin filaments 127 are drawn in the same manner as heretofore described with reference to the apparatus shown in FIGS. 3 and 4. As shown in FIG. 9, if desired, the resin filament forming unit may be substantially of the same length as the drum or spool 132, with the unit in fixed position with reference to the drum.

A glass melting furnace 135 is mounted above the downturning edge of the drum 132, and is provided with an orifice plate 136. The furnace 135 operates in the same manner as heretofore described with reference to the glass melting furnace 7 shown in FIG. 1, and reciprocates back and forth as the furnace 7. The resin filament forming unit 114 extends substantially coextensively with the drum, and is not reciprocated. The resin filament forming unit 114 is pivotly mounted so that the angularity of the unit may be changed. The resin filaments 127 preferably are drawn from the resin filament forming unit 114 substantially perpendicularly to the downturning edge of the drum 132.

FIG. 10 shows a modified form of apparatus in which two resin filament forming units 140 and 141, similar to the resin filament forming unit 14 shown in FIGS. 3 and 4, are used to form filaments from two different resins, for example, filaments of an epoxy resin are drawn from the unit 140 and filaments of a phenolic resin are drawn from the unit 141. The epoxy resin filaments and the phenolic resin filaments are combined, and the phenolic resin filaments are a hardener for the epoxy resin filaments. The two resin filament forming units 140 and 141, for two different resins, may be used in lieu of the single resin filament forming unit 14 of FIGS. 1 to 4, and operate in the same manner as heretofore described with reference to the resin filament forming unit 14, with the resin filaments drawn by the rotating drum 142.

Referring to the modified form of apparatus shown in FIG. 11; a glass melting furnace 150 is of the same construction as the heretofore described furnace 70 shown in FIG. 6. The glass filaments 151 are drawn from the bushing plate 152 of the furnace 150 and collected at the entrance end of a resin mist, or fog, apparatus 153 which is of a conventional design well known in the art. As the filaments 151 pass through the resin mist apparatus 153, the surface of the glass filaments have a coating of resin deposited on their surfaces from the resin mist, or fog, produced by the apparatus 153. The resin coated glass filaments 151 pass from the exit end of the apparatus 153 to the downturning edge of the rotating drum 155 which draws the filaments 151 from the bushing plate 152 and collects them on the drum 155 in the same manner as heretofore described.

FIG. 12 shows a modified form of apparatus in which glass filaments 160 are drawn from the glass melting furnace 161, provided with an orifice plate 162, said glass furnace 161 being similar in construction and operation as heretofore described with reference to the glass furnace 7 as shown in FIGS. 1 to 4 inclusive. Resin filaments 165 are drawn from the resin filament forming unit 166, which is similar in construction and operation to the resin filament forming unit 14 shown in FIGS. 1 to 4 inclusive. The glass filaments 160 and the resin filaments 165 are collected together and before or when the resin filaments 165 come into contact with the rotating drum 167, they are sprayed by any convenient means with a catalyst and a monomer or hardener in the same manner as heretofore described. The combined filamentary product 170 passes from beneath the bottom of the drum 167 to the top of a V-shaped pulley 171, or similar means, which is rotated by any convenient means in the direction of the arrow indicated on the pulley. As shown in full lines in FIG. 12, the combined filaments 170 may pass between a pair of opposed rollers 172 and 173, respectively rotated by any convenient means in the direction of the arrow shown, to a chopper 175, which is of a conventional design well known in the art and commonly used in the production of what is known as chopped strand.

As shown in dotted lines in FIG. 12, the combined strand 170 may be collected on a rotatable spool 180 as a continuous filamentary product, if it is not desired to form a chopped strand product from the filamentary product 170.

FIG. 13 shows diagrammatically a manner in which the glass filaments and resin filaments may be formed by arrangement of the orifice openings in the respective forming units. Glass filaments 190 may be arranged to be positioned alternately with resin filaments 191.

It is obvious that various modifications may be made in my method and apparatus as disclosed herein without departing from the essential features of my invention, and, therefore, I do not desire to limit myself to the precise details of construction and operation as herein described.

I claim:
1. The method of forming a filamentary product comprising continuously drawing resin filaments from a molten mass of resin from a row of orifices by means of a member rotating about an axis; and continuously combining said drawn resin filaments with a plurality of glass filaments on said rotating member.

2. The method of forming a filamentary product comprising continuously drawing resin filaments from a viscous mass of resin from a row of orifices by means of a member rotating about an axis; and continuously combining said drawn resin filaments with a plurality of glass filaments on said rotating member.

3. The method of forming a filamentary product comprising continuously drawing resin filaments from a viscous mass of resin from a row of orifices by means of a member rotating about an axis; continuously combining each of said drawn resin filaments with one of a plurality of glass filaments; and applying a catalyst to said combined filaments before said filaments come into engaging contact with said rotating member.

4. The method of forming a filamentary product comprising continuously drawing resin filaments from a viscous mass of resin from a row of orifices by means of a member rotating about an axis; continuously combining each of said drawn resin filaments with one of a plurality of glass filaments; and applying a catalyst to said combined filaments when said filaments come into engaging contact with said rotating member.

5. The method of forming a filamentary product comprising continuously drawing resin filaments from a viscous mass of resin from a row of orifices by means of a member rotating about an axis; continuously combining each of said drawn resin filaments with one of a plurality of glass filaments; and applying a monomer to said combined filaments before said filaments come into engaging contact with said rotating member.

6. The method of forming a filamentary product comprising continuously drawing resin filaments from a viscous mass of resin from a row of orifices by means of a member rotating about an axis; continuously combining each of said drawn resin filaments with one of a plurality of glass filaments; and applying a monomer to said combined filaments when said filaments come into engaging contact with said rotating member.

7. The method of forming a continuous filamentary product comprising drawing a plurality of continuous resin filaments from a viscous mass of resin from a row of orifices by means of a drum rotating about an axis; combining each of said plurality of resin filaments with one of a plurality of continuous glass filaments; applying a catalyst and a monomer to said combined filaments when said resin filaments come into engaging contact with said rotating drum; and collecting such continuous filamentary product on said drum.

8. The method of forming a continuous filamentary product comprising drawing a plurality of continuous resin filaments from a viscous mass of resin from a row of orifices by means of a drum rotating about an axis; combining each of said plurality of resin filaments with one of a plurality of continuous glass filaments; applying a monomer to said combined filaments when said resin filaments come into engaging contact with said rotating drum; and collecting such continuous filamentary product on said drum.

9. The method of forming a filamentary product comprising simultaneously separately drawing glass filaments from orifices of a furnace with a drum rotating about an axis; continuously drawing resin filaments from a viscous mass of resin from a row of orifices; and continuously combining each of said resin filaments with one of said glass filaments when said filaments come into engaging contact with said rotating drum.

10. The method of forming a continuous filamentary product comprising simultaneously separately drawing glass filaments from orifices of a furnace with a drum rotating about an axis and drawing a plurality of continuous resin filaments from a viscous mass of resin from a row of orifices; combining each of said resin filaments with one of said glass filaments; and applying a catalyst and a monomer to said combined filaments before said filaments come into engaging contact with said rotating drum.

11. The method of forming a continuous filamentary product comprising simultaneously separately drawing glass filaments from orifices of a furnace with a drum rotating about an axis and drawing a plurality of continuous resin filaments from a viscous mass of resin from a row of orifices; combining each of said resin filaments with one of said glass filaments; and applying a catalyst and a monomer to said combined filaments when said filaments come into engaging contact with said rotating drum.

12. The method of forming a continuous filamentary product comprising simultaneously separately drawing glass filaments from orifices of a furnace with a drum rotating about an axis and drawing a plurality of continuous resin filaments from a viscous mass of resin from a row of orifices; combining each of said resin filaments with one of said glass filaments; applying a catalyst and a monomer to said combined filaments; and collecting said continuous filamentary product on said drum.

13. The method of forming a continuous filamentary product comprising simultaneously separately drawing glass filaments from orifices of a furnace with a drum rotating about an axis and drawing a plurality of continuous resin filaments from a viscous mass of resin from a row of orifices in a resin melting unit; combining each of said resin filaments with one of said glass filaments; reciprocating said resin melting unit back and forth in a direction parallel to the axis of rotation of said drum; and applying a catalyst and a monomer to said combined filaments when said filaments come into engaging contact with said rotating drum.

14. The method of forming a filamentary product comprising continuously drawing a multiplicity of resin filaments from a viscous mass of resin from a row of orifices by means of a drum rotating about its axis; forming said multiplicity of said resin filaments into a resin roving; continuously combining said resin roving with a glass filament roving; and applying a catalyst and a monomer to said combined resin roving and glass roving when said rovings come into engaging contact with said rotating drum.

15. The method of forming a continuous filamentary product comprising drawing a plurality of continuous resin filaments from a viscous mass of resin from a row of orifices in a resin melting unit by means of a drum rotating about its axis; forming said plurality of resin filaments into a resin filament strand; combining said resin filament strand with a preformed glass filament strand; and applying a catalyst and a monomer to said combined resin filament strand and glass filament strand when said combined strands come into engaging contact with said rotating drum.

16. Method of forming a continuous filamentary product comprising drawing a plurality of continuous resin filaments from a viscous mass of resin from a row of orifices in a resin melting unit with a drum rotating about an axis; forming said plurality of resin filaments into a resin filament strand; combining said resin filament strand with a preformed glass filament strand; reciprocating said resin melting unit back and forth in a direction parallel to the axis of rotation of said drum; and applying a monomer to said combined resin filament strand and glass filament strand when said combined strands come into engaging contact with said rotating drum.

17. Apparatus for forming resin filaments comprising a rotatable drum having a downturned edge; a viscous resin supply means positioned above said downturned edge of said drum; means for heating a supply of resin in said resin supply means; a series of spaced apart apertures at the forward part of said resin supply means and in open communication wtih said supply of viscous resin, said series of spaced apart apertures extending generally parallel to the axis of rotation of said drum; means for angularly adjusting said resin supply means with respect to the axis of said drum.

18. Apparatus for forming resin filaments comprising a rotatable drum having a downturned edge; a viscous resin supply means positioned above said downturned edge of said drum; means for heating a supply of resin in said resin supply means; a series of spaced apart orifices at the forward part of said resin supply means extending generally parallel to the axis of rotation of said drum; a shelf-like member in said resin supply means in open communication at its ends respectively with said supply of viscous resin and said series of spaced apart orifices; and means for effecting angular adjustment of said shelf-like member with respect to the axis of said drum.

19. A product comprising a plurality of filaments of a resin combined with a plurality of glass filaments, produced in accordance with the process of claim 1.

20. The method of forming a continuous filamentary product comprising simultaneously separately drawing glass filaments from orifices of a glass furnace with a drum rotating about an axis, said furnace being reciprocated back and forth in a direction substantially parallel with the axis of rotation of the drum, drawing a plurality of continuous resin filaments from a viscous mass of resin from a row of orifices substantially coextensive with the face of the drum; combining said resin filaments with said glass filaments; and applying a monomer to said combined filaments when said filaments come into engaging contact with said rotating drum.

21. The method of forming a continuous filamentary product comprising simultaneously separately drawing glass filaments from orifices of a glass furnace with a drum rotating about an axis, said furnace being reciprocated back and forth in a direction substantially parallel with the axis of rotation of the drum, drawing substantially perpendicularly to the downturning edge of said drum a plurality of continuous resin filaments from a viscous mass of resin from a row of orifices extending substantially coextensive with the face of said drum; combining said resin filaments with said glass filaments; and applying a catalyst and a monomer to said combined filaments when said filaments come into engaging contact with said rotating drum.

22. The method of forming a filamentary product comprising separately and continuously drawing resin filaments from viscous masses of two different types of resins from rows of orifices by means of a member rotating about an axis, one of said masses of resin being of a type which is a hardener for the other type of resin; continuously combining said two different types of resin filaments together with a plurality of glass filaments; and winding said filamentary product on said rotating member.

23. The method of forming a filamentary product comprising separately and continuously drawing resin filaments from viscous masses of an epoxy resin and a phenolic resin from rows of orifices by means of a member rotating about an axis, said phenolic resin being of the type which is a hardener for the epoxy resin; continuously combining said two different types of resin filaments together with a plurality of glass filaments; and winding said filamentary product on said rotating member.

24. The method of forming a filamentary product comprising continuously drawing glass filaments from orifices of a glass furnace with a drum rotating about an axis; continuously combining said glass filaments into a glass filament strand; passing said combined glass filament strand through a resin mist contained within an enclosure, to coat the surfaces of said glass filaments with a deposited coating of resin mist; and winding said resin coated glass filament strand on said drum.

25. The method of forming a filamentary product comprising continuously drawing glass filaments from orifices of a glass furnace with a drum rotating about an axis; continuously combining said glass filaments into a glass filament roving; passing said combined glass filament roving through a resin fog contained within an enclosure, to coat the surfaces of said glass filaments with a deposited coating of resin; and winding said resin coated glass filament strand on said drum.

26. The method of forming a fiber glass and resin chopped strand product comprising simultaneously separately drawing glass filaments from orifices of a glass furnace with a member rotating about an axis and continuously drawing a plurality of resin filaments from a viscous mass of resin from a row of orifices; continuously combining said resin filaments with said glass filaments; applying a catalyst and a monomer to said combined filaments; forming said combined glass and resin filaments into a strand product; and chopping said combined strand product into short pieces.

27. The method of forming a fiber glass and resin chopped strand product comprising simultaneously separately drawing glass filaments from orifices of a glass furnace with a member rotating about an axis and continuously drawing a plurality of resin filaments from a viscous mass of resin from a row of orifices; continuously combining said resin filaments with said glass filaments; applying a monomer to said combined filaments; forming said combined glass and resin filaments into a strand product; and chopping said combined filamentary strand product into short pieces.

28. The method of forming a fiber glass and resin strand filamentary product comprising simultaneously separately drawing glass filaments from orifices of a glass furnace with a member rotating about an axis and continuously drawing a plurality of resin filaments from a viscous mass of resin from a row of orifices; continuously combining said resin filaments with said glass filaments; applying a catalyst and a monomer to said combined filaments; forming said combined resin filaments into a filamentary strand product; and collecting said combined filamentary strand product on a rotating spool.

29. The method of forming a continuous filamentary product comprising simultaneously separately drawing a plurality of glass filaments from orifices of a glass furnace with a drum rotating about an axis and drawing a plurality of continuous resin filaments from a mass of viscous resin from a row of orifices of a resin filament forming unit; positioning said orifices of said glass furnace and said orifices of said resin filament forming unit with respect to each other so as to form alternating resin filaments and glass filaments; combining said alternating resin filaments and said glass filaments; and applying a catalyst and a monomer to said combined filaments before said combined filaments come into engaging contact with said rotating drum.

30. The method of forming a continuous filamentary product comprising simultaneously separately drawing a plurality of glass filaments from orifices of a glass furnace with a drum rotating about an axis and drawing a plurality of continuous resin filaments from a mass of viscous resin from a row of orifices of a resin filament forming unit; positioning said orifices of said glass furnace and said orifices of said resin filament forming unit with respect to each other so as to form alternating resin filaments and glass filaments; combining said alternating resin filaments and said glass filaments; and applying a monomer to said combined filaments when said combined filaments come into engaging contact with said rotating drum.

References Cited in the file of this patent

UNITED STATES PATENTS

| | | |
|---|---|---|
| 2,133,237 | Slayter | Oct. 11, 1938 |
| 2,527,628 | Francis | Oct. 31, 1950 |
| 2,539,301 | Foster | Jan. 23, 1951 |
| 2,574,221 | Modigliani | Nov. 6, 1951 |
| 2,707,499 | Pullman | May 3, 1955 |
| 2,810,426 | Till et al. | Oct. 22, 1957 |
| 2,888,711 | Finlayson et al. | June 2, 1959 |
| 2,953,849 | Morgan | Sept. 27, 1960 |
| 3,060,674 | Slayter | Oct. 30, 1962 |